No. 802,634. PATENTED OCT. 24, 1905.
W. N. GREER.
DUST PAN.
APPLICATION FILED DEC. 15, 1904.
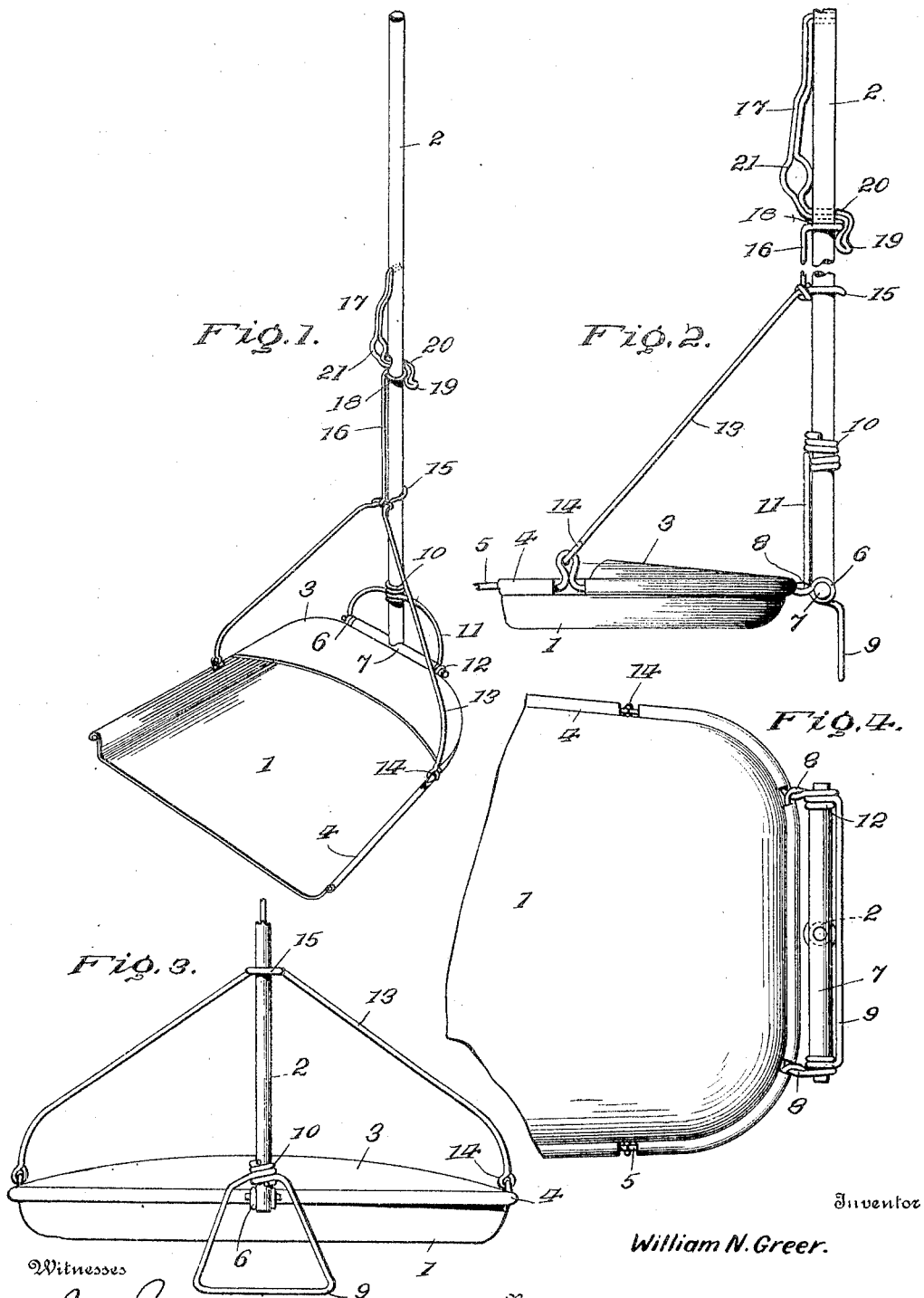
Inventor
William N. Greer.

UNITED STATES PATENT OFFICE.

WILLIAM N. GREER, OF GREELEY, NEBRASKA, ASSIGNOR OF ONE-HALF TO JOHN CROCKETT, OF GREELEY, NEBRASKA.

DUST-PAN.

No. 802,634.     Specification of Letters Patent.     Patented Oct. 24, 1905.

Application filed December 15, 1904. Serial No. 236,984.

*To all whom it may concern:*

Be it known that I, WILLIAM N. GREER, a citizen of the United States, residing at Greeley, in the county of Greeley and State of Nebraska, have invented certain new and useful Improvements in Dust-Pans, of which the following is a specification.

This invention relates to that type of dustpans the structure of which is designed particularly to avoid the necessity of bending over on the part of the user in disposing sweepings or similar foreign material in the bottom of the pan.

The invention embodies, essentially, a handle and a pan adapted for adjustment at an angle to the handle, so that it may rest firmly upon the floor or in a similar position preparatory to sweeping dust or the like thereinto, the pan being adapted to be thrown approximately in alinement with the handle in order to dump the sweepings therefrom.

For a full description of the invention and the merits thereof and also to acquire a knowledge of the details of construction of the means for effecting the result reference is to be had to the following description and accompanying drawings.

While the invention may be adapted to different forms and conditions by changes in the structure and minor details without departing from the spirit or essential features thereof, still some of the preferred embodiments are shown in the accompanying drawings, in which—

Figure 1 is a perspective view of a dustpan embodying the invention. Fig. 2 is a side elevation, the dust-pan being shown in the position assumed thereby preparatory to sweeping material onto the same. Fig. 3 is a view of a modification. Fig. 4 is a bottom plan view of the preferred construction of the invention.

Corresponding and like parts are referred to in the following description and indicated in all the views of the drawings by the same reference characters.

Referring to the invention as set forth in the drawings, the numeral 1 designates the pan, and the numeral 2 the handle thereof. The pan 1 is of the general form at present in use, being preferably provided at its rear extremity with the usual guard 3. The invention consists, primarily, in the peculiar mounting of the handle 2 upon the pan, and in carrying out the above the edge portions 4 of the pan from the front extremity thereof to the rear extremity are folded over a reinforcing-strip 5, which strip is preferably a single length of wire of suitable gage. The wire or strip 5 is bent at the rear portion of the pan, so as to form spaced loops 6, which loops form journals for a transverse bar 7, the ends of which are mounted therein. The handle 2 extends from the bar 7, and the latter forms a pivotal support for the handle. In the preferred construction the lower extremity of the handle 2 passes through the bar 7. In forming the loops 6, which constitute the journals of the bar 7, the wire is preferably twisted so that each loop 6 will be provided with a shank portion 8 of considerable rigidity necessary for the purposes of the invention. The pan 1 is also provided with a suitable foot-piece 9, and the latter is made from a length of material, such as wire, having its end portions bent about the handle 2, as shown at 10, and extended laterally therefrom to form brace members 11. The members 11 are looped about the ends of the cross-bar 7, as indicated at 12, and thence extended downwardly to form the body of the foot-piece 9, above mentioned. When the handle is in a vertical position and the pan extended at an angle thereto, the lower portion of the foot-piece 9 rests upon the floor or other support, as the case may be, and rigidly holds the pan in a position convenient for sweeping material thereon. In order that the pan 1 may be positively held in a position at an angle to the handle 2, a suitable bail 13 is utilized, said bail being connected at its extremities with eyes 14 at the side of the pan 1. The eyes 14 are also preferably formed by bending the reinforcing-strip 5 into loop members, through which the extremities of the bail 13 pass. The bail is formed between its ends with a loop 15, receiving the handle 2, said loop being freely slidable upon the handle in a manner readily apparent. The bail 13 is connected to the lower end of a runner 16, movable longitudinally of the handle 2 and coöperating with a catch 17, to positively position the pan relative to the handle. The runner 16 comprises a bar, at the upper end of which is provided a runner-loop 18, and the catch 17 coöperates with the loop 18 in holding the bail 13 in such a position that the pan 1 is supported at an angle to the handle 2. The catch 17 is also of peculiar formation, being made from a single length of wire bent upon itself between its ends to form a hook 19, the shank 20 of which passes through a transverse opening in the handle 2. Adjacent the shank 20 of the catch 17 the elements of the wire are separated or bulged apart to form a finger-piece 21, which may be readily grasped in manipulating the catch. From the finger-piece 21 the end portions of the wire from which the catch is made extend in contact with each other, the extremities being projected into the body of the handle, and thus secured thereto. The finger-piece 21 when forced toward the handle 2 will cause the hook 19 to disengage from the loop 18.

In the use of the receptacle when it is desired to sweep dust or similar material into the pan 1 the runner-loop 18 is engaged by the catch 17, which catch under spring action normally tends to hold said hook in engagement with the runner. The foot-piece 9 will support the pan in proper horizontal position preparatory to sweeping material thereon, and after this has been done the pan may be lifted by grasping the handle in the usual manner. In order to discharge the contents of the pan 1 the finger-piece 21 is slightly depressed to disengage the hook 19 from the runner-loop 18, whereupon the weight of the pan and its contents will cause the same to move downwardly into a position approximately in alinement with the handle.

Fig. 3 illustrates a modification of the invention in which the handle has the cross-bar passed through the lower extremity thereof. In this instance the journal members are closer together and the cross-bar somewhat shorter than in the preferred construction of the device.

Having thus described the invention, what is claimed as new is—

The combination of a dust-pan, a handle pivoted to the pan at the rear thereof, a bail connected at its upper portion to the handle and at its ends to the sides of the pan, a runner mounted upon the handle and connected with the bail, the handle being provided with an opening therethrough at a point between its ends, and a catch secured to the handle and coöperating with the runner aforesaid and comprising a single length of wire bent upon itself between its ends to form the hook 19, the elements of the wire being passed through the opening in the handle forming the shank 20, the elements of the wire adjacent the shank 20 being separated or bulged apart to form the finger-piece 21.

In testimony whereof I affix my signature in presence of two witnesses.

WILLIAM N. GREER. [L. S.]

Witnesses:
S. E. HORTON,
T. J. HOWARD.